U S007550212B2

(12) United States Patent
Uchiumi (10) Patent No.: US 7,550,212 B2
(45) Date of Patent: Jun. 23, 2009

(54) TAPE-SHAPED RECORDING MEDIUM, AND APPARATUS AND METHOD FOR PROCESSING THE SAME

(75) Inventor: Kyouhisa Uchiumi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 469 days.

(21) Appl. No.: 11/265,144

(22) Filed: Nov. 3, 2005

(65) Prior Publication Data

US 2006/0115688 A1    Jun. 1, 2006

(30) Foreign Application Priority Data

Nov. 30, 2004  (JP)  .............................. 2004-345138
Mar. 11, 2005  (JP)  .............................. 2005-068289

(51) Int. Cl.
*B05D 5/12*  (2006.01)
*G11B 5/71*  (2006.01)

(52) U.S. Cl. ...................... 428/839.6; 428/842; 360/134

(58) Field of Classification Search .............. 428/839.6, 428/141, 840.6, 842, 845.5, 845.7, 845.1, 428/845, 900; 360/134; 250/201.5; 427/130; 242/348; 216/90
See application file for complete search history.

(56) References Cited

U.S. PATENT DOCUMENTS 5,958,565 A * 9/1999 Hattori et al. ............. 428/845.1

6,429,411 B1 * 8/2002 Iwasaki et al. ........... 250/201.5
2004/0178191 A1    9/2004 Yajima et al.
2004/0214046 A1 * 10/2004 Ejiri et al. .................... 428/845

FOREIGN PATENT DOCUMENTS

| JP | 5-307731 A | 11/1993 |
|---|---|---|
| JP | 8-63740 A | 3/1996 |
| JP | 9-138945 A | 5/1997 |
| JP | 9-265625 A | 10/1997 |
| JP | 2004039175 A | 2/2004 |
| JP | 2004-164808 A | 6/2004 |
| JP | 2004164808 A | 6/2004 |

* cited by examiner

*Primary Examiner*—Kevin M. Bernatz
*Assistant Examiner*—Louis Falasco
(74) *Attorney, Agent, or Firm*—Sughrue Mion, PLLC

(57) ABSTRACT

Disclosed are a magnetic tape capable of being wound regularly, and an apparatus and a method by which the tape is wound regularly. The tape-shaped recording medium, which includes a tape-shaped support body and a recording layer being formed on a surface of the support body, is curved laterally over its whole length and said tape-shaped recording medium being curved laterally over its whole length and having a surface arching across a whole width of the medium. Furthermore, it is preferable that a curved amount of the medium ranges from 0.5 mm/m to 4.0 mm/m and an arched amount of the medium ranges from 0.3 mm to 2.0 mm.

8 Claims, 7 Drawing Sheets

FIG. 3A
POSITIVE-CURVED MAGNETIC TAPE

FIG. 3B
NEGATIVE-CURVED MAGNETIC TAPE

TAPE-SHAPED RECORDING MEDIUM, AND APPARATUS AND METHOD FOR PROCESSING THE SAME

BACKGROUND OF THE INVENTION

1. Field of the Invention

The present invention relates to a tape-shaped recording medium, and an apparatus and a method for processing the medium. More specifically, the present invention is directed to a tape-shaped recording medium capable of being wound regularly, and an apparatus and a method by which the medium is wound regularly.

2. Description of the Related Art

Generally, linear and helical types of magnetic tapes of, for example, 12.7 mm wide are being used widely for external backup recording media for computers, etc. Magnetic tapes of these types are typically handled, with being wound around a tape reel. While a tape is being wound around a tape reel of a winder or a drive, the edge of the tape is sometimes irregular. Especially, when a tape is wound at a high speed, this irregularity is more likely to occur. Such irregularity may damage a tape during transport, or may cause a tape to be curled badly during storage. This badly curled shape is prone to be maintained, and it contributes to the deteriorated running accuracy of a tape in a drive, thereby causing servo tracking errors. Therefore, it is important for a tape to be wound regularly in terms of keeping the high quality level.

On the other hand, it has been known that if a tape has a predetermined laterally curved form, then it less likely to produce the irregularities. This results in the stability of smooth running of a tape, thereby improving the servo tracking property. This technique is disclosed in Japanese Unexamined Patent Application Publication 9-265625.

Figure 8:
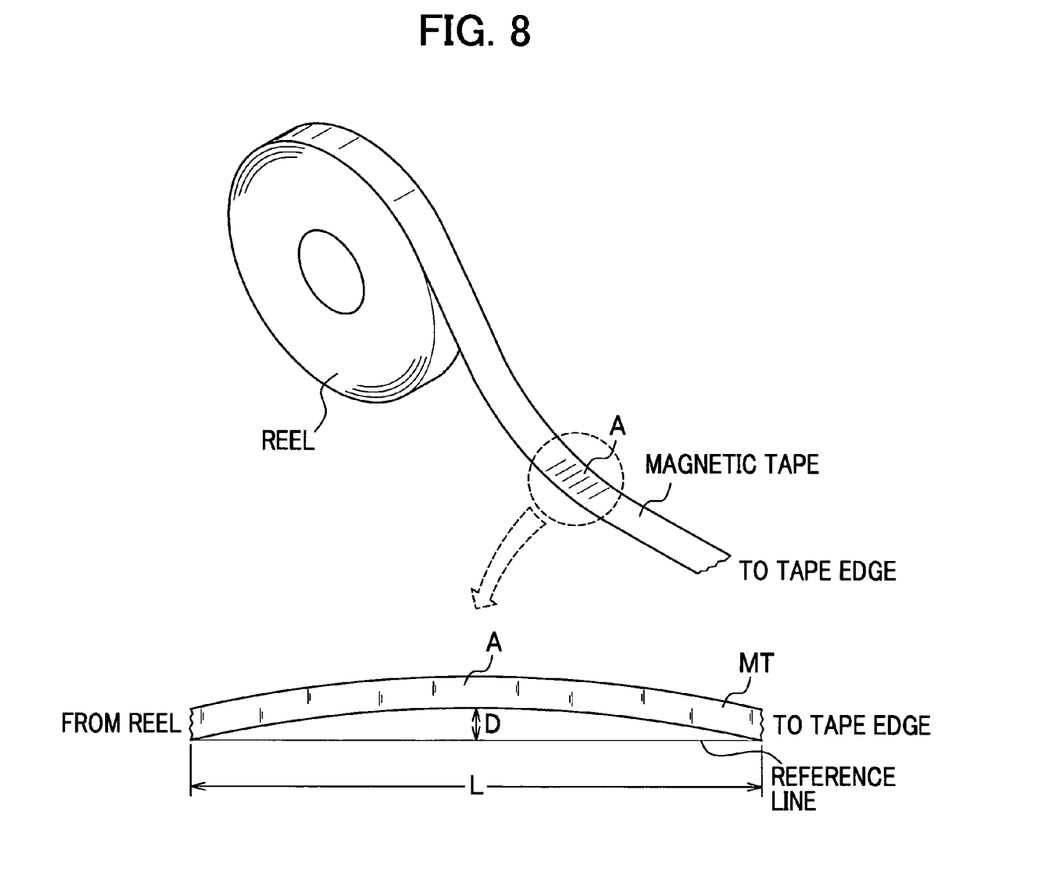
FIG. 8 is a plan view for explaining a curved shape of a magnetic tape.

This predetermined laterally curved shape is recognized by placing the tape on a plat surface and by viewing it from the top. Alternatively, as shown in FIG. 8, it is recognized based on how much a magnetic tape MT deviates from a straight line (reference line) passing through two points on one edge of the tape.

If curved over its whole length by a predetermine amount, then a magnetic tape will be wound regularly. Otherwise, its wound form may become worse. Accordingly, in order to roll up a magnetic tape appropriately, various techniques for curving a magnetic tape by a predetermined amount have been proposed, such as Japanese Unexamined Patent Application Publications 9-138945 and 2004-164808. Herein, the curving amount is expressed by D/L, where L stands for the specific length of a tape, and L stands for a maximum value of an amount where a tape deviates from the reference line.

JP9-138945 discloses a technique for curving magnetic tapes during a tape manufacturing step. Specifically, a magnetic tape is wound around a tapered tape-winding surface. Following this, it is kept standing as it is for a prescribed time. Finally, one side of the wound magnetic tape is expanded so that the tape becomes curved.

JP2004-164808 also discloses a technique for curving magnetic tapes during a tape manufacturing step. In this technique, a magnetic tape is wound around a tapered reel hub. Subsequently, it is left standing as it is at equal to/less than the glass transformation temperature. By this heat exposure, a tape is curved appropriately, thereby ensuring the uniform wound form of a magnetic tape.

Meanwhile, if a surface of a magnetic tape arches in the direction where a magnetic layer is formed, then its durability is improved, thus preventing dropout (data errors) (see Japanese Unexamined Patent Application Publications 5-307731 and 8-63740). Herein, such arching of a tape is called "cupping".

In a magnetic tape to which a technique of JP9-265625 is applied, its wound form is typically better, as the magnetic tape is curved more sharply. However, on certain conditions, that is, depending on the surface property, edge form, edge rigidity, etc. of a tape, its wound form may be irregular. In this case, it is impossible to provide desired production yields.

Furthermore, according to the technique of JP9-138945, the farther away from a hub a magnetic tape is, the less prominently the shape of the hub acts on the wound form, due to spaces between the wound tape, the thickness difference along the width, or the flash of the tape reel. In addition, the wound form may be affected by the tolerance of the length or the curved shape of a tape, because of the variations in manufacturing quality or the shape of the reel hub.

Moreover, in the technique of JP2004-164808, a magnetic tape is shrunken by a heat treatment, and gaps may be thus formed in the middle of the tape roll. These gaps lead to the irregularity of the tape roll. In this case, the surface of a tape may be damaged, or downstream processes may be impossible to carry out. During the heat treatment, the magnetic tape is fastened and pressed inward, so that the tape becomes wider toward the inside of a roll.

As for cupping of a magnetic tape as in JP5-307731 and JP8-63740, it is known that the sufficient effect is not produced.

Taking the above disadvantages into account, the present invention has been conceived. An object of the present invention is to provide a magnetic tape capable of being wound regularly, and an apparatus and a method by which the tape is wound regularly.

SUMMARY OF THE INVENTION

According to an aspect of the present invention, there is provided, a tape-shaped recording medium includes a tape-shaped support body and a recording layer being formed on a surface of the support body. In addition, the medium is curved laterally over its whole length, and has a surface arching across a whole width of the medium.

Moreover, in this medium, it is preferable that a curved amount of the medium ranges from 0.5 mm/m to 4.0 mm/m, and an arched amount of the medium ranges from 0.3 mm to 2.0 mm.

Furthermore, in this medium, it is preferable that the support body be made of any one of a polyethylene terephthalate film, polyethylene naphtahalate film, and aramid film.

According to another aspect of the present invention, there is provided, a method for processing a tape-shaped recording medium, which includes the step of fabricating a pancake by rolling up a tape-shaped recording medium around a tapered winding surface of a hub, and the step of subjecting the pancake to a heat treatment, wherein upon fabricating the pancake, the hub has a diameter that is at least 0.5 times as large as an outer diameter of the pancake.

Moreover, in the method, it is preferable that the heat treatment which the pancake undergoes meets a relation:

$$t \geq k \cdot T^{-5},$$

where t, k and T stand for time (h), a coefficient and a treatment temperature (° C.), respectively.

According to still another aspect of the present invention, there is provided, an apparatus for processing a tape-shaped recording medium, including:

(1) a supply reel around which a source of a plurality of tape-shaped recording media is possible to roll up;

(2) a cutting mechanism for cutting the source to a predetermined width, thereby forming the tape-shaped recording media; and (3) a plurality of take-up mechanisms for rolling up the corresponding tape-shaped recording media, thus producing a plurality of pancakes;

the take-up mechanisms, each of which includes a hub having an outer surface around which the tape-shaped recording medium is possible to roll up, the hub having first and second sides, respective diameters of which differ from each other.

Furthermore, a ratio between longer one L1 out of the diameters of both sides of the hub and a diameter L3 of each of the pancakes is set to satisfy a relation:

$$0.5 \leq L1/L3 \leq 1.0.$$

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

A detailed description will be given below, of a tape-shaped recording medium and a method for processing the medium which are both according to an embodiment of the present invention, with reference to attached drawings. It should be noted that a magnetic tape is provided as an example of the tape-shaped recording medium in the following description, although the present invention is not limited thereto. Alternatively, the tape-shaped recording medium may be an optical recording medium.

First, a magnetic tape according to an embodiment of the present invention will be described.

(Magnetic Tape)

Figure 1:
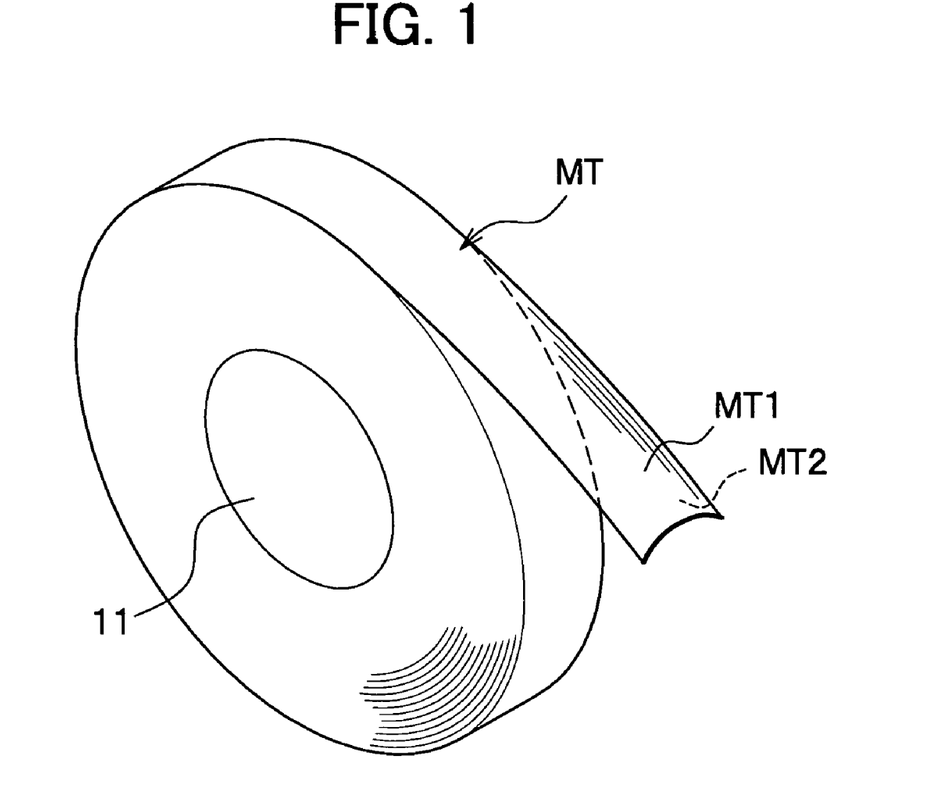
FIG. 1 is a perspective view depicting a magnetic tape wound around a hub.

Referring to FIG. 1, a magnetic tape MT includes a non-magnetic support body (base film), a magnetic layer (recording layer) and a back coat layer. The magnetic and back coat layers are formed on respective surfaces of the base film. Furthermore, the total thickness of the magnetic tape MT is about 10 μm.

<Support Body>

Examples of material of the support body include a polyester (such as polyethylene terephthalate (PET) or polyethylene naphtahalate (PEN)), a polyolefin (such as polypropylene), a cellulosic material (such as nitrocellulose), and a polymeric material (such as polyamide, polyimide, polyvinyl chloride, polycarbonate or aramid). It is preferable that the support body be made of a polyester, because it is a low-cost material and has superior workability and mechanical property. Preferably, polyethylene naphtahalate (PEN) is used, because of its high strength, rigidity and heatproof property. More preferably, an aramid film is used if heatproof property is critical.

<Magnetic Layer>

Magnetic powder and binding agent are mixed into an organic solvent. Then, the magnetic powder is distributed uniformly. As a result, a magnetic coating is prepared. Subsequently, this magnetic coating is applied to a surface of the non-magnetic support body. Finally, a magnetic layer is formed. Alternatively, a ferromagnetic material such as a metal or an alloy is bonded to a surface of the support body with vacuum deposition or sputtering. The thickness of the magnetic layer is, preferably equal to/less than 0.3 μm in order to follow a current high-density capacity trend. Furthermore, dispersing agent, lubricant, antistatic agent, plasticizer, stabilizer, and anticorrosives are added to the magnetic coating.

Examples of the magnetic powder include ferromagnetic iron oxide particles (such as y-$Fe_2O_3$, $Fe_3O_4$ or cobalt y-$Fe_2O_3$) ferromagnetic chromium dioxide particles, a metal (such as Fe, Co or Ni), an alloy containing metals (such as Fe, Co or Ni), and hexagonal ferrite fine particles.

Examples of the binding agent include polymer (such as urethane, vinyl chloride, vinyl acetate, vinyl alcohol, vinylidene chloride, acrylic ester, styrene, butadiene or acrylonitrile), copolymer consisting of two or more of them, polyester resin and epoxy resin.

Examples of the organic solvent include ether, ester, ketone, aromatic hydrocarbon, aliphatic hydrocarbons, and chlorinated hydrocarbon.

<Back Coat Layer>

The back coat layer may be a known back coat layer, and its material may be carbon containing a binding agent and a solvent. Its thickness is, preferably equal to/more than 0.3 μm.

<Cupping Amount D1>

Figure 2:
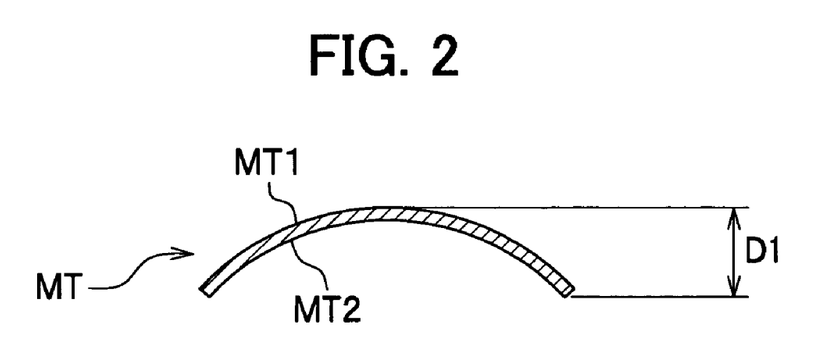
FIG. 2 is a cross-sectional view of the magnetic tape along its width.

Referring to FIG. 2, a magnetic tape MT is bent in such a way that a surface MT1 forms an outward arch, in other words, a surface MT2 forms an inward arch. This arched shape makes it possible to improve the contact between the tape and a magnetic head, when the tape is loaded into a drive.

Specifically, supposing that the magnetic tape MT of FIG. 2 has a thickness of 12.7 mm (½ inch), a cupping amount (arched amount) D1 ranges from 0.3 mm to 2.0 mm.

The cupping amount D1 can be adjusted by a combination of the thicknesses of the magnetic layer and the back coat layer. To give an example, it is assumed that the magnetic layer of 1.5 μm thick is formed on the support body made of polyethylene terephthalate of 6 μm thick. By setting the thickness of the back coat layer to a range from 0.3 μm to 0.7 μm, the cupping amount D1 ranging from 0.3 mm to 2.0 mm is obtained.

Alternatively, the cupping amount D1 can be adjusted by selecting the heat shrinkage factors of each layer.

1: three or more irregularities of equal to/more than 0.3 mm were found.

The scores 4 and 5 were regarded as "good", and the others were "poor".

In addition, the proof test was to check scratches and deformation of the edge "ed", after the magnetic tape MT had been run for 500 hours at a temperature of 40° C. and at a humidity of 20%.

TABLE 1

|  | CURVED AMOUNT D2 (mm/m) | CUPPING AMOUNT D1 (mm) | WOUND FORM SCORE | WOUND FORM DETERMINATION | PROOF TEST |
| --- | --- | --- | --- | --- | --- |
| EXAMPLE 1 | 1.5 | 1.5 | 5 | GOOD | PASS |
| EXAMPLE 2 | 3.5 | 0.4 | 4 | GOOD | PASS |
| EXAMPLE 3 | 3.8 | 1.5 | 5 | GOOD | PASS |
| COMPARATIVE EXAMPLE 1 | 0.3 | 0.8 | 1 | POOR | PASS |
| COMPARATIVE EXAMPLE 2 | 0.4 | 2.2 | 2 | POOR | FAIL |
| COMPARATIVE EXAMPLE 3 | 1.6 | 0.1 | 3 | POOR | PASS |
| COMPARATIVE EXAMPLE 4 | 4.8 | 2.6 | 5 | GOOD | FAIL |
| COMPARATIVE EXAMPLE 5 | 5.2 | 0.6 | 5 | GOOD | FAIL |

Moreover, in this embodiment, the surface MT1 arches outward, although the present invention is not limited thereto. Alternatively, the surface MT2 may arch outward.

<Curved Amount D2>

Figure 3A:
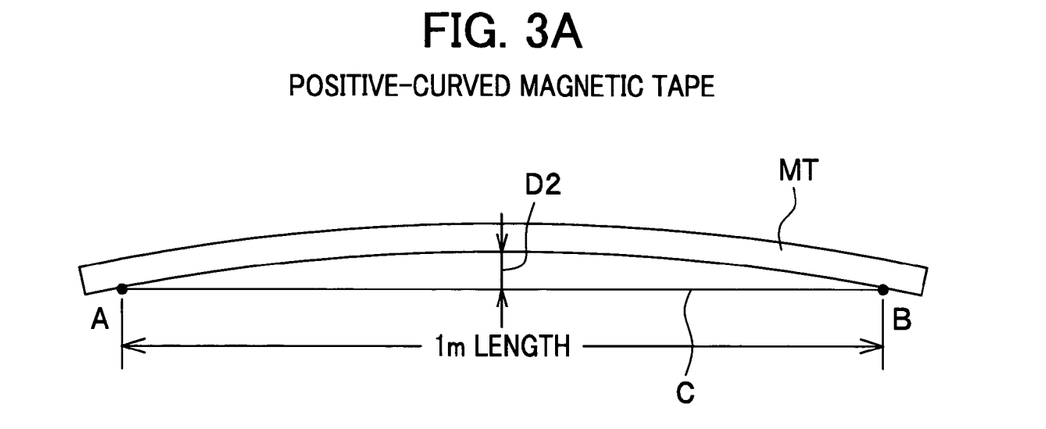
FIG. 3A is a plan view depicting a positive-curved magnetic tape.
Figure 3B:
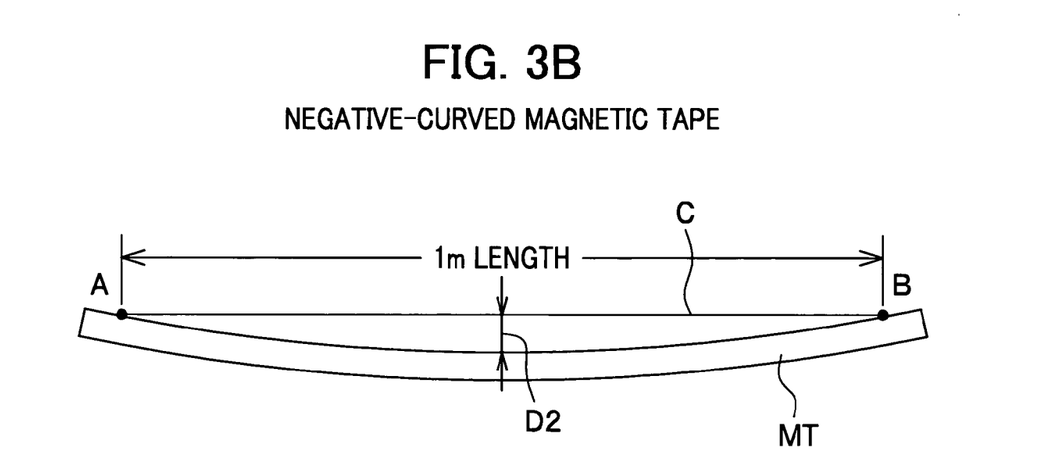
FIG. 3B is a plan view depicting a negative-curved magnetic tape.

Referring to FIGS. 3A and 3B, the magnetic tape MT is curved laterally with respect to a reference line C passing through points A and B on one edge of the tape. Specifically, its curved amount D2 may range from 0.5 mm/m to 4.0 mm/m.

In this embodiment, a direction in which the magnetic tape MT of FIG. 3A is curved is defined as a positive direction, and a direction in which the magnetic tape MT of FIG. 3B is defined as a negative direction.

How to curve the magnetic tape MT is as follows. First, the tape is wound around a hub 11, thereby forming a pancake PC. Then, this pancake is subjected to a heat treatment according to a method that will be described later.

<Combination of Curved Amount D2 and Cupping Amount D1>

The inventor has found a proper combination of the curved amount D2 and the cupping amount D1 as a result of diligent consideration. This proper combination is shown as follows.

Figure 5:
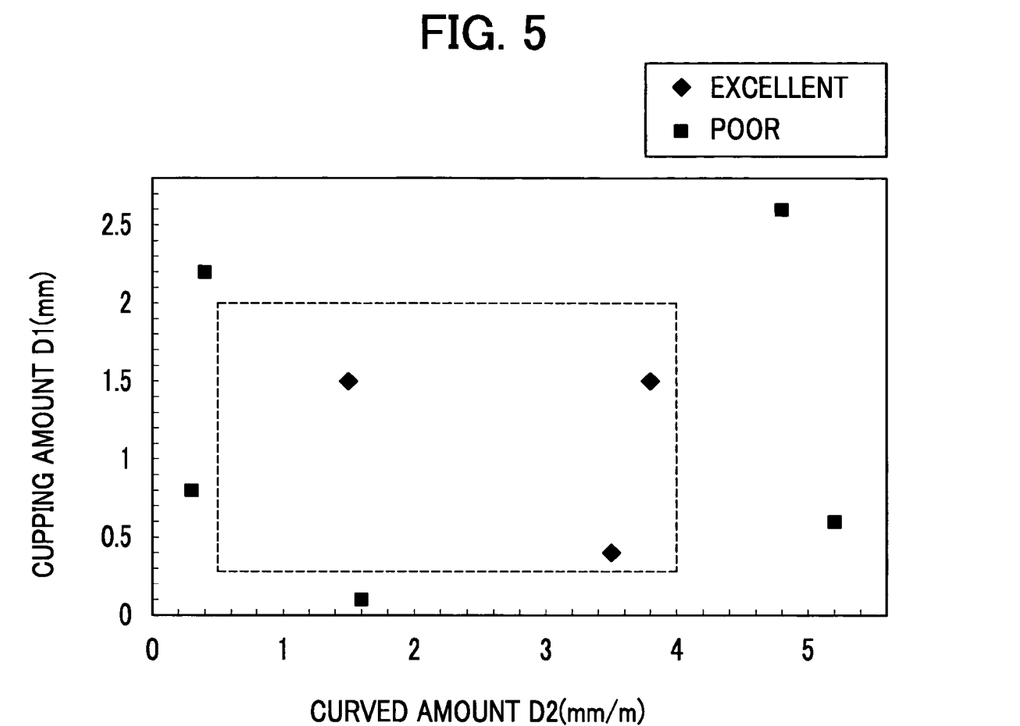
FIG. 5 is a graph revealing a combination of a cupping amount and a curved amount of a tape.

The wound form of the magnetic tape MT was evaluated by naked eyes, and this result was shown in FIG. 5. The evaluated tape MT had the total thickness of 8 μm, and it included the magnetic layer of 0.15 μm thick and the support body made of polyethylene terephthalate. The wound form was checked and the proof test was conducted, when the curved amount D2 and the cupping amount D1 were varied. This result was shown in a table 1.

In the table 1, the score of the wound form was defined as follows:

from the edge "ed" of the magnetic tape MT,

5: no irregularities were found;

4: irregularities of equal to/less than 0.05 mm were found;

3: irregularities of about 0.2 mm were found;

2: irregularities of equal to/more than 0.3 mm were found;

As is clear from the above evaluation results of the examples 1 to 3, the wound form is better as the curved amount D2 is larger. However, the samples having the curved amount D2 of more than 4.0 mm/m failed to meet the quality criteria in the durability test, due to the edge damage and deformation. Also, the sample having the cupping amount D1 of more than 2.0 mm failed.

FIG. 5 is a graph for determining an ideal combination between the curved amount D2 and the cupping amount D1. In this graph, the allowable ranges of the wound form and of the proof test are plotted by a dotted line. As it is clear from this graph, a magnetic tape MT of which the curved amount D2 ranges from 0.5 mm/m to 4.0 mm/m and the cupping amount D1 ranges from 0.3 mm to 2.0 mm has the excellent wound form and quality.

Figure 4A:
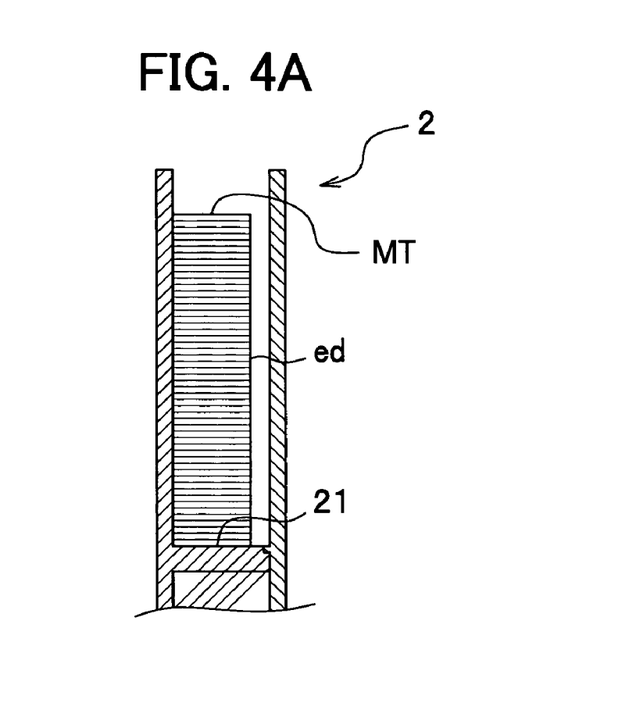
FIG. 4A is a cross-sectional view of a main portion of a tape reel in which a magnetic tape is wound around the reel hub uniformly.
Figure 4B:
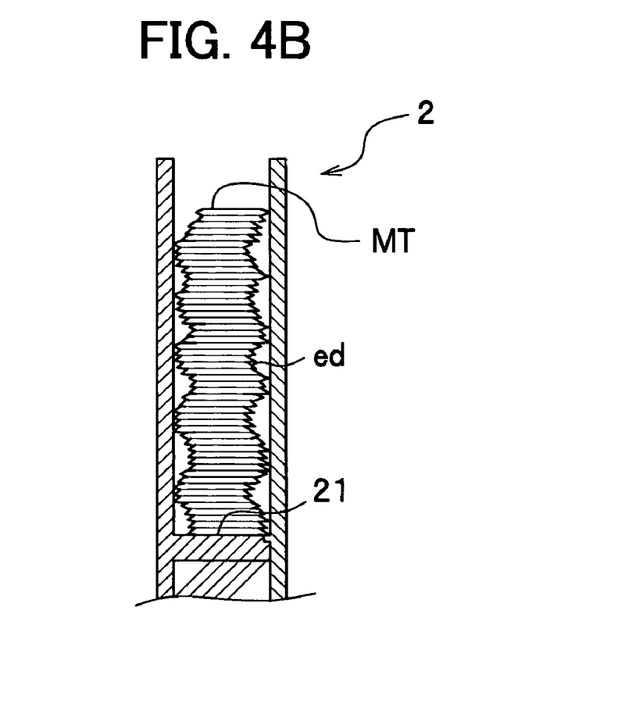
FIG. 4B is a cross-sectional view of a main portion of a tape reel in which a magnetic tape is wound around the reel hub nonuniformly.

Referring to FIGS. 4A and 4B, the magnetic tape MT is wound, by a predetermined amount, around a reel hub 21 of a tape reel 2 with a flange, and the tape is then shipped at it is. In this case, the magnetic tape MT according to this embodiment can establish the excellent wound form where one edge is uniform, as shown in FIG. 4A. This makes it possible to produce the high production yields and to stabilize the smooth running of the magnetic tape MT, thereby enhancing the servo tracking performance. In contrast, the magnetic tape M of which the cupping amount D1 and curved amount D2 fall outside the above ranges provides the poor wound form where the edge "ed" is nonuniform, as shown in FIG. 4B.

Furthermore, the magnetic tape MT according to this embodiment attains the long time running and prevents dropout (data errors).

(Method and Apparatus for Processing Tape-shaped Recording Medium)

Next, a description will be given below, of a method and an apparatus for processing a tape-shaped recording medium which are both according to the embodiment of the present invention, with reference to attached drawings. Note that a magnetic tape is provided as an example of the tape-shaped recording medium in the following description, but the present invention is not limited thereto. The method for processing the tape-shaped recording medium (magnetic tape) is aimed at curving the medium laterally by a predetermined amount. This method includes a winding step of making a pancake (roll) from a magnetic tape source or a web, and a heat processing step of subjecting the pancake to a heat treatment.

(Magnetic Tape Source)

The magnetic tape source for forming a pancake will be described below, prior to the description of each step. A magnetic tape source has the same structure as that of the magnetic tape (see FIG. 1), and it is constituted by forming a magnetic layer on a non-magnetic support body (base film) of equal to/less than 10 μm thick. Furthermore, the magnetic tape source is cut to a predetermined width, thereby making the magnetic tape MT.

(Winding Step)

The winding step will be described below with reference to FIG. 6. In this embodiment, the winding step includes cutting a magnetic tape source, that is, a web WB to thereby form multiple magnetic tapes MT, and then, rolling up the tapes around corresponding hubs 11 so that a pancake 1 is formed. However, a winding step of the present invention is not limited to the above step. Alternatively, the winding step of the present invention may include rolling up the tapes having been cut to the pancake.

Figure 6:
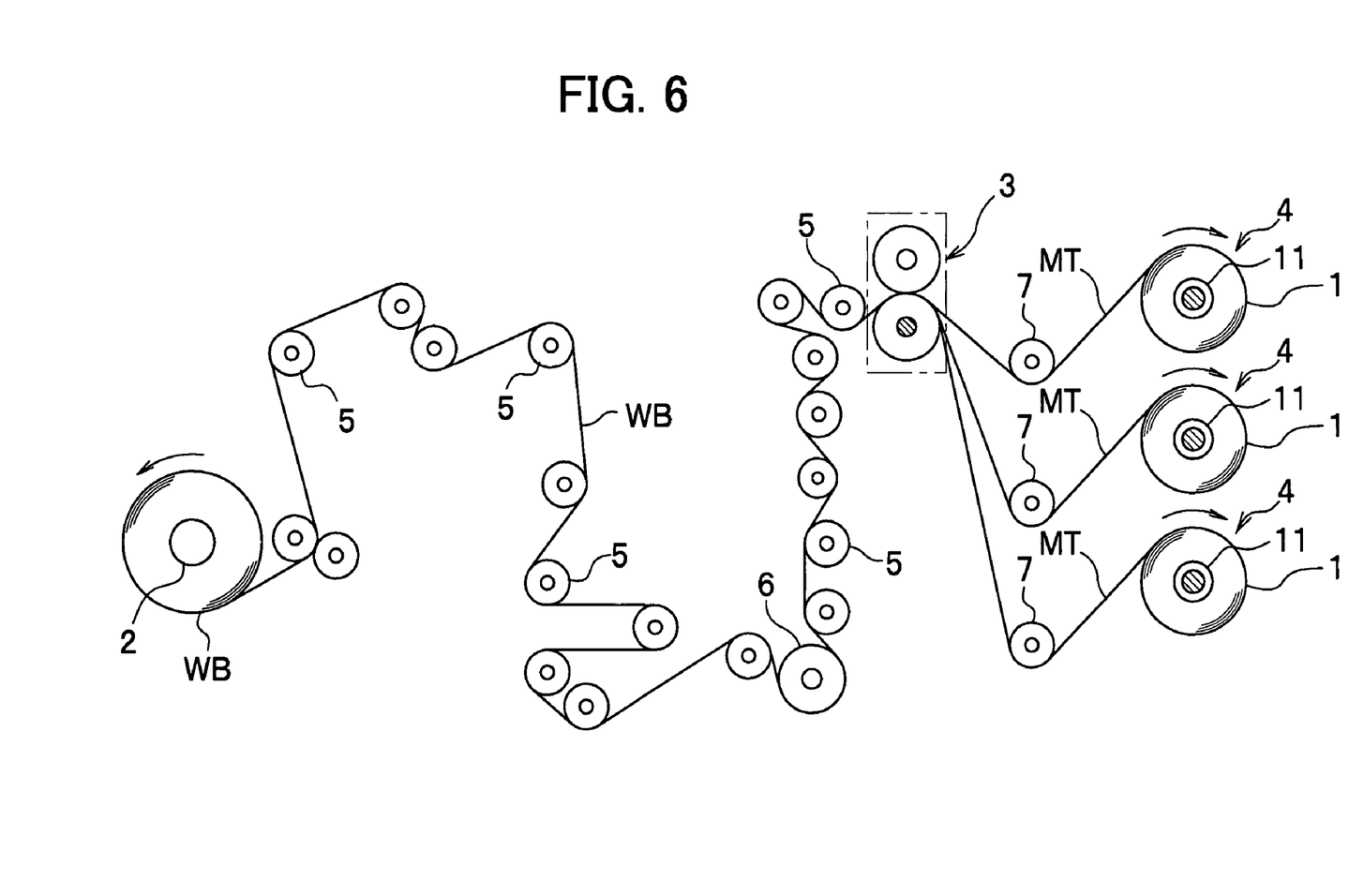
FIG. 6 is a perspective view depicting a line where performed is a winding step of a method for processing a magnetic tape according to an embodiment of the present invention.

Referring to FIG. 6, a line on which the winding step is performed is composed of:

(1) a supply reel 2 that rotates the web WB;
(2) a cutting device 3 that cuts the web WB to a predetermined width, thereby forming the multiple magnetic tapes MT; and
(3) take-up devices 4 which are arranged, for example, at three stages, and roll up the tapes MT around hubs 11.

Furthermore, the line includes:

(4) guide rollers 5 that guide the web WB from the supply reel 2 to the cutting device 3;
(5) a ground suction drum 6; and
(6) tension rollers 7 provided corresponding to the take-up devices 4.

Each of the hubs 11 is made of, for example, a metal such as aluminum, AS resin, phenol or epoxy resin. It is preferable that glass fiber be added to this material by 10% to 40% by weight for reinforcement.

Figure 7:
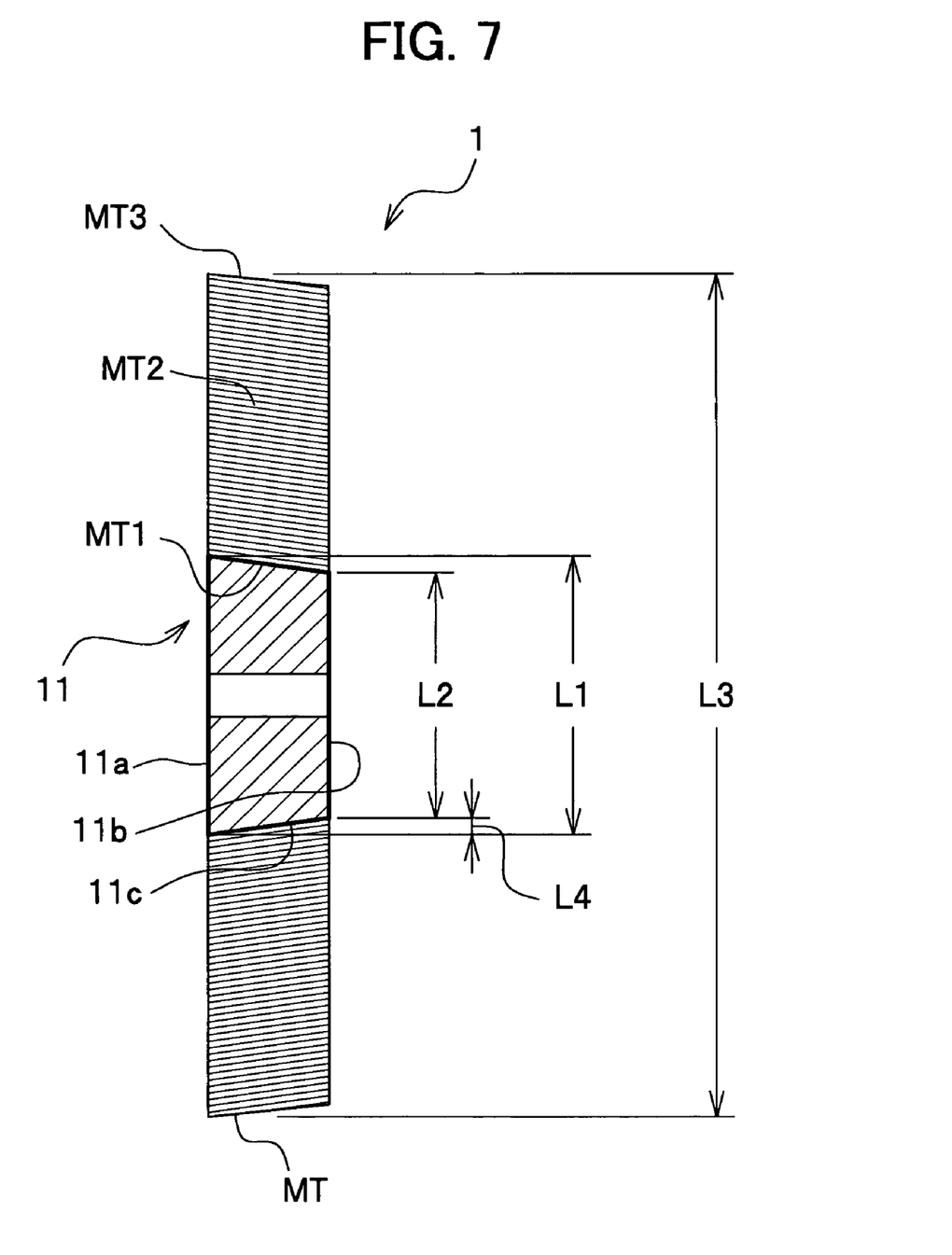
FIG. 7 is a cross-sectional view of a pancake that carries out the method.

Referring to FIG. 7, the hub 11 has two sides 11a and 11b of which respective diameters L1 and L2 differ from each other. In other words, the hub 11 has a tapered winding surface 11c. Once wound around the winding surface 11c, the magnetic tape MT is curved laterally. The ratio of respective diameters of the side 11a and the side 11b (L1/L2) against a curved amount D2 is revealed in the following table 2.

TABLE 2

| | CURVED AMOUNT (mm/m) | | | | |
|---|---|---|---|---|---|
| | 0.5 | 1 | 2 | 4 | 8 |
| DIAMETER RATIO (L1/L2) | 1.00007 | 1.0001 | 1.0003 | 1.0006 | 1.0012 |

As is clear from this table, the proper range of the diameter ratio is 1.00007 to 1.0012. When the curved amount D2 is set to 4 mm/m, then the curved amount D2 is 1.0006. Note that if the width of the hub is changed, it needs to be determined based on the above ratio.

Moreover, it is preferable that in the hub 11, the diameter L1 of the side 11a be at least 0.5 times as large as an outer diameter L3 of the pancake 1 (L1≧L3·0.5). This enables the number of the magnetic tape MT wound around the hub 11 to be limited. Accordingly, the shape of the hub 11 can act on the tape on the outer side of the pancake 1 more prominently. As a result, it is possible to curve the tape on the outer side of the pancake 1 precisely. In contrast, in conventional winding step, a hub with a diameter of 11.4 cm and a pancake with a diameter of 36.0 cm have been used. In other words, a hub that is about 0.3 times as large as a pancake has been used. In this case, the tape on the outer side of the pancake 1 is not curved with precision.

In the above-described winding step line of FIG. 6, the web WB at the supply reel 2 is guided by the guide rollers 5, etc., and it is then made to pass through the cutting device 3 so that the web WB is cut to the multiple magnetic tapes MT. Subsequently, the magnetic tapes MT are wound around the corresponding hubs 11 of the take-up devices 4, while the winding tension of the hubs 11 is adjusted to equal to/more than 0.8 N/cm. By adjusting the winding tension to this value, the variations in the tape width can be reduced. A detailed description about the winding tension will be given later. Finally, the magnetic tapes MT are wound up around the hubs 11 so that the pancakes 1 are made.

(Heat Processing Step)

After the winding step, the pancake 1 undergoes a heat treatment for a prescribed time, whereby the proper wound form is established.

In this step, the following relation needs to be met:

$$t \geq k \cdot T^{-5}$$

wherein t stands for time (h), k stands for a coefficient, and T stands for a processing temperature d (° C).

The coefficient k is a proportionality constant depending on the support body of the magnetic tape MT (or magnetic tape source). To give an example, assuming that the support body is made of polyethylene terephthalate (PET), K is $10^{10}$ preferably, $2 \times 10^{10}$. By setting the coefficient k to this value, the curved amount D2 is made sufficient for practical applications. Furthermore, the processing temperature T needs to be equal to/less than the glass transformation temperature of support body of the magnetic tape MT. Specifically, the temperature T falls within a range from 40° C. to 69° C.

It is known that when the pancake 1 of FIG. 7 undergoes the heat treatment, stress applied to a middle perimeter MT2 is reduced, as the difference (L3-L1) between an inside perimeter MT1 and an outer perimeter MT3 is larger. This decrease in the stress may cause the irregularity of the tape. However, in this embodiment, the wound number of the magnetic tape MT is reduced by using the substantially large hub 11. Therefore, the difference (L3-L1) decreases. Because of this decrease in the difference (L3-L1), the stress applied to the middle perimeter MT2 is not reduced. The irregularity of edge of the pancake 1 is therefore hard to occur. In addition, the inward stress applied to the magnetic tape also decreases, so that the tape is prevented from being pressed and thus, from being widened.

Consequently, by decreasing the number of the magnetic tape MT in the pancake 1, the magnetic tape MT can be curved laterally with stability. The curved magnetic tape MT is wound, by a predetermined length, around the reel hub 21 of tape reel 2 with the flange, as shown in FIG. 4A or 4B. In this embodiment, since the magnetic tape MT is curved appropriately, the edge "ed" of the magnetic tape MT is regular. Thus, the uniform wound form is established, as shown in FIG. 4A. In contrast, if a pancake in which the tape is not curved appropriately is used, then the edge "ed" of the magnetic tape MT is irregular. Namely, the wound form is nonuniform, as shown in FIG. 4B.

When the number of the magnetic tape MT around the hub 11 is reduced, a tape at the middle perimeter is hard to be irregular during heat treatment. This prevents the magnetic tape MT from being rubbed, so that the magnetic tape MT is not damaged. In addition, the variations in the tape width at the inside perimeter MT1 also decreases during heat treatment. This prevents the edge "ed" of the magnetic tape MT from being nonuniform, so that the edge "ed" is not damaged.

On the other hand, it is in demand that the magnetic tape MT is wound around the hub 11 as long as possible, in order to enhance productivity in a factory. However, as the wound tape is longer, the above-described disadvantages are more likely to occur, such as the curved amount decreases, the tape width increases, or the tape edge is irregular. To find a proper compromise between the tape length and the quality, the following evaluation has been made.

(Diameter of Hub)

The three same magnetic tapes of 9 μm thick and 4000 m long were wound around NAB-standard hubs with a diameter of 114 mm (tapered amount of 30 μm), 150 mm (tapered amount of 40 μm), and 250 mm (tapered amount of 70 μm), respectively. Subsequently, after these tapes underwent heat treatment, the degrees of their individual qualities were evaluated and compared. This result was shown in a table 3. The individual tapered amounts of the hubs were adapted for the curved amount of 2 mm/m. In this case, note that the tapered amount stood for the difference between the diameters of the one side and the other side (L4 of FIG. 7), and the width variation stood for the increment of the tape width.

TABLE 3

|  | HUB DIAMETER (mm) | HUB DIAMETER/ PANCAKE DIAMETER | INSIDE PERIMETER CURVED AMOUNT (mm/m) | OUTSIDE PERIMETER CURVED AMOUNT (mm/m) | IRREGULARITY OF TAPE EDGE | TAPE WIDTH VARIATION (μM) |
|---|---|---|---|---|---|---|
| EXAMPLE 1 | 150 | 0.57 | 1.6 | 0.8 | GOOD | 3 |
| EXAMPLE 2 | 250 | 0.76 | 1.8 | 1.2 | GOOD | 2 |
| COMPARATIVE EXAMPLE 1 | 114 | 0.47 | 1.7 | 0.2 | POOR | 6 |

Referring to the table 3, the comparative example 1 (the hub having the diameter of 114 mm) exhibited the considerable difference between the inside and outside perimeter curved amounts. Specifically, its inside perimeter curved amount was 1.7 mm/m, while its outside perimeter curved amount was 0.2 mm/m. Thus, this sample was not curved uniformly. In addition, this sample caused the edge irregularity and it showed the tape width variation of as great as 6 μm.

In contrast, the example 1 (the hub having the diameter of 150 mm) hardly exhibited the considerable difference between the inside and outside perimeter curved amounts. Specifically, its inside perimeter curved amount was 1.6 mm/m, while its outside perimeter curved amount was 0.8 mm/m. In addition, the rubbing of the tape was not caused, and the tape width variation was half as great as that of the comparative example 1. Furthermore, in the example 2 (the hub having the diameter of 250 mm), the inside perimeter curved amount was 1.8 mm/m, while the outside perimeter curved amount was 1.2 mm/m. In addition, the edge was uniform, and the tape width variation was one-third as great as that of the comparative example 1.

It is found from the above results that the diameter of a hub needs to be larger than that of a pancake by equal to/more than 0.5 times, preferably 0.6 times. However, in consideration of the space factor of a take-up device, the diameter of a pancake is, preferably equal to/less than 600 mm. Furthermore, assuming that a magnetic tape of 9 μm width and 10000 m long is wound, the diameter of the hub is, preferably at most 500 mm. As the diameter of the hub is shorter, its effect is less significant. However, it is cleared from the result that the effect is still sufficient for practical applications, even if the hub having the diameter of 150 mm (example 1) is used.

(Curved Amount)

To curve the magnetic tape MT by a desired amount, the hub needs to have a tapered amount in proportion to its diameter. This tapered amount is determined as follows.

TABLE 4

[Hub Diameter is 150 mm]

| | CURVED AMOUNT (mm/m) | | | | |
|---|---|---|---|---|---|
| | 0.5 | 1 | 2 | 4 | 8 |
| TAPERED AMOUNT (μm) | 10 | 15 | 45 | 90 | 180 |

TABLE 5

[Hub Diameter is 200 mm]

| | CURVED AMOUNT (mm/m) | | | | |
|---|---|---|---|---|---|
| | 0.5 | 1 | 2 | 4 | 8 |
| TAPERED AMOUNT (μm) | 14 | 20 | 60 | 120 | 240 |

TABLE 6

[Hub Diameter is 250 mm]

| | CURVED AMOUNT (mm/m) | | | | |
|---|---|---|---|---|---|
| | 0.5 | 1 | 2 | 4 | 8 |
| TAPERED AMOUNT (μm) | 18 | 25 | 75 | 150 | 300 |

Next, a magnetic tape was wound around a tapered winding surface of a hub, and it was then subjected to a heat treatment on the condition that a temperature was 60° C., a humidity was 25%, and time was 32 hours. After this treatment, the curved amount of the tape was measured. This result was shown in a table 7. Each item was an average value of data having been measured five times.

TABLE 7

|  | HUB DIAMETER (mm) | TAPERED AMOUNT (μm) | CURVED AMOUNT (mm/m) |
|---|---|---|---|
| EXAMPLE 3 | 150 | 10 | 0.53 |
| EXAMPLE 4 | 150 | 90 | 3.89 |
| EXAMPLE 5 | 250 | 18 | 0.45 |
| EXAMPLE 6 | 250 | 150 | 4.21 |

In the example 3, the tapered amount of the hub was targeted for 10 μm in order to form the curved amount of 0.5 mm/m by using the hub having a diameter of 150 mm (see table 4). The actual curved amount was 0.53 mm/m, which was nearly equal to the target value. It is found that the other examples 4 to 6 also have a desired curved amount, by referring to the tables 4 to 6.

(Winding Tension)

A magnetic tape was wound around the non-tapered surface of a hub having a diameter of 250 mm, while its winding tension was changed. This evaluation was shown in a table 8. In this case, a winding speed was set to 10 m/s.

TABLE 8

|  | WINDING TENSION (gf/0.5 inch) | INSIDE PERIMETER CURVED AMOUNT (mm/m) | OUTSIDE PERIMETER CURVED AMOUNT (mm/m) | IRREGULARITY OF TAPE | TAPE WIDTH VARIATION (μm) |
|---|---|---|---|---|---|
| EXAMPLE 7 | 100 | 1.8 | 1.2 | GOOD | 1 |
| EXAMPLE 8 | 120 | 1.8 | 1.3 | GOOD | 1 |
| COMPARATIVE EXAMPLE 2 | 80 | 1.8 | 1.4 | POOR | 2 |

Referring to the table 8, there was no considerable difference between the inside and outside curved amounts in these samples. However, the comparative example 2 caused the edge irregularity and exhibited the tape width variation of as much as 2 μm under the condition that the winding tension was 80 gf/0.5 inch (≈0.6 N/cm). In contrast, the example 7 showed no edge irregularity and the tape width variation of 1 μm at the winding tension of 100 gf/0.5 inch (≈0.8 N/cm). This tape width variation was half as great as that of the comparative example 2. Accordingly, it can be seen that the sample 7 exhibits the excellent result. Furthermore, the example 8 shows as an excellent result as that of the example 7 at the winding tension of 120 gf/0.5 inch (≈0.9 N/cm).

It consideration of the above result, it is possible to prevent the irregularity of a tape, as well as to decrease the variation in the width of the tape, by winding the tape at the winding tension of equal to/more than 0.8 N/cm. It appears that the inward stress applied to a tape is strengthened, in other words, the variation in the tape width is made great, as the winding tension increases. However, it is, in fact, considered that the tape is stretched to be narrowed due to such a strong winding tension.

(Heat Processing Time)

To determine a temperature and a time at which the curved shape of a tape was saturated in a heat treatment, the curved amount was measured with the change in the temperature and in the time under the condition other parameters related to the formation of curved shape were constant. This result was shown in a table 9. A pancake to be subjected to the heat treatment included a support body made of polyethylene terephthalate (PET), and it was wound around a hub having a diameter of 200 mm at a winding tension of 100 gf/0.5 inch.

TABLE 9

|  | TEMPERATURE (° C.) | | | | |
|---|---|---|---|---|---|
|  | 25 | 40 | 50 | 60 | 65 |
| TIME (h) | 2160 | 168 | 72 | 24 | 18 |
| $T = 2 \times 10 \times T^{-5}$ | 2048 | 195 | 64 | 25 | 17 |
| CURVED AMOUNT (mm/m) | 1.6 | 1.7 | 1.9 | 1.8 | 2.0 |

From the results of the table 9, the following relation between a temperature T and a time t at which the curved shape was saturated was determined:

$$t \approx 2 \cdot 10 \cdot T^{-5}.$$

As to an actual heat processing step, it is necessary to reach a compromise between the productivity and the effect. Therefore, the curved amount of a tape was measured, after the tape was exposed to the heat during half of the determined saturation time. This measurement result was shown in a table 10.

TABLE 10

|  | TEMPERATURE (° C.) | | | | |
|---|---|---|---|---|---|
|  | 25 | 40 | 50 | 60 | 65 |
| TIME (h) | 1080 | 84 | 36 | 12 | 9 |
| CURVED AMOUNT (mm/m) | 1.2 | 1.0 | 1.0 | 1.3 | 1.2 |

Referring to the results of the table 10, it is found that the enough curved amount is obtained even for half of the saturation time. Accordingly, the relation between the temperature T and the time t can be expressed by the following equation:

$$t \geq 10^{10} \cdot T^{-5}.$$

Note that the coefficient of $T^{-5}$ may be changed depending on the condition of the support body, etc. Hence, the relation between the temperature T and the time t simply satisfies the following equation:

$$t \geq k \cdot T^{-5}.$$

In addition, it is preferable that the humidity be regulated to within a range from 20% to 80%, so that a tape is prevented from being irregular, as well as the variation in the tape width is reduced.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A tape-shaped recording medium comprising:
   a tape-shaped support body; and
   a recording layer being formed on a surface of the support body,
   said tape-shaped recording medium being curved laterally over its whole length, and having a surface arching across a whole width of the medium,
   wherein a curved amount of the medium ranges from 0.5 mm/m to 4.0 mm/m, and an arched amount of the medium ranges from 0.3 mm to 2.0 mm.

2. The tape-shaped recording medium according to claim 1,
   wherein the support body is selected from a group consisting of a polyethylene terephthalate film, a polyethylene naphtahalate film, and an aramid film.

3. The tape-shaped recording medium according to claim 1,
   wherein the support body is selected from a group consisting of a polyethylene terephthalate film, a polyethylene naphtahalate film, and an aramid film.

4. The tape-shaped recording medium according to claim 1,
   wherein the arched amount indicates a distance between a side edge and a top of the arched medium.

5. The tape-shaped recording medium according to claim 4,
   wherein a back coat layer is formed on the other surface of the support body, and
   wherein the arched amount is adjustable by changing a thickness of the recording layer and a thickness of the back coat layer.

6. A tape-shaped recording medium comprising:
   a tape-shaped support body; and
   a recording layer being formed on a surface of the support body,
   said tape-shaped recording medium being curved laterally over its whole length, and having a surface arching across a whole width of the medium,
   wherein a curved amount of the medium ranges from 0.5 mm/in to 4.0 mm/in, and an arched amount of the medium ranges from 0.3 mm to 2.0 mm, and
   wherein the tape-shaped recording medium is wound around a hub with a winding tension ranging from 0.8 N/cm to 0.9 N/cm.

7. The tape-shaped recording medium according to claim 1,
   wherein the tape-shaped recording medium further comprises a magnetic tape.

8. The tape-shaped recording medium according to claim 6,
   wherein the tape-shaped recording medium further comprises a magnetic tape.

* * * * *